United States Patent [19]
Moore

[11] Patent Number: 5,831,779
[45] Date of Patent: Nov. 3, 1998

[54] TELESCOPIC AUTOMOTIVE SIDE MIRROR

[76] Inventor: Martin Craig Moore, P.O. Box 446, Chicago Park, Calif. 95712

[21] Appl. No.: 636,233

[22] Filed: Apr. 23, 1996

[51] Int. Cl.[6] .............................. G02B 7/182; B60R 1/06
[52] U.S. Cl. ........................ 359/841; 359/843; 359/878; 248/476
[58] Field of Search .................................... 359/841, 843, 359/872, 877, 878, 881; 248/476, 480

[56] References Cited

U.S. PATENT DOCUMENTS

| | | | |
|---|---|---|---|
| 3,820,877 | 6/1974 | Moyer | 359/841 |
| 3,825,324 | 7/1974 | Brewington | 359/878 |
| 3,937,563 | 2/1976 | Frabe | 359/841 |
| 4,558,930 | 12/1985 | Deedreek | 359/881 |
| 4,911,545 | 3/1990 | Miller | 359/878 |
| 5,483,385 | 1/1996 | Boddy | 359/881 |

FOREIGN PATENT DOCUMENTS

| | | | |
|---|---|---|---|
| 3330952 | 12/1984 | Germany | 359/872 |
| 3509654 | 9/1986 | Germany | 359/878 |
| 0251255 | 11/1987 | Japan | 359/872 |
| 2193940 | 2/1988 | United Kingdom | 359/872 |

*Primary Examiner*—Ricky D. Shafer

[57] ABSTRACT

A telescopic automotive side mirror including a mirror housing attached to a side of a vehicle. The mirror housing has a tubular mirror bracket and a mirror supported therein. The housing has a support tube positioned within and interconnected to a plurality of webbing supports. A hydraulic cylinder is interconnected to a first end of the bracket and within the support tube. The hydraulic cylinder has an exit port and a receiving coupler. A shaft is positioned within the hydraulic cylinder, with a portion projecting from the exit port. The shaft has a threaded proximal end and a threaded distal end secured within the mirror housing by a locking nut. Lastly, an air compressor is in the vehicle and has a supply tube extending through to the mirror bracket. The supply tube couples with the receiving coupler. The air compressor supplies air pressure to the shaft to move the shaft within the hydraulic cylinder, for movement of the mirror housing.

16 Claims, 3 Drawing Sheets

TELESCOPIC AUTOMOTIVE SIDE MIRROR

BACKGROUND OF THE INVENTION

1. Field of the Invention

The present invention relates to a telescopic automotive side mirror and more particularly pertains to allowing the side mirror to be positioned a greater distance from the side of a vehicle when the mirror bracket of the side mirror is interconnected to a hydraulic cylinder and shaft, and further coupled with the mirror housing to expand and retract the mirror housing from the bracket.

2. Description of the Prior Art

The use of an adjustable side mirror is known in the prior art. More specifically, adjustable side mirrors heretofore devised and utilized for the purpose of adjusting side view mirrors attached to the exterior of a vehicle are known to consist basically of familiar, expected, and obvious structural configurations, notwithstanding the myriad of designs encompassed by the crowded prior art which has been developed for the fulfillment of countless objectives and requirements.

By way of example, U.S. Pat. No. 5,339,192 to Cho discloses a structure of back mirror for vehicle. U.S. Pat. No. 5,205,182 to Gilbert discloses a cable actuated mirror tilt control. U.S. Pat. No. 5,012,693 to Enomoto, Yamamoto, Nagayama and Yamauchi discloses a drive mechanism for rear-view mirror assembly of motor-driven folding type. U.S. Pat. No. 4,982,926 to Mori and Kogita discloses a retractable mirror apparatus. U.S. Pat. No. Des. 274,054 to Barows discloses an adjustable wing mirror attachable to the rear view mirror of a vehicle or similar article. Lastly, U.S. Pat. No. 3,820,877 to Moyer discloses an extendable and retractable motor vehicle mirror arms.

While these devices fulfill their respective, particular objectives and requirements, the aforementioned patents do not describe telescopic automotive side mirror that allows the mirror bracket to remain attached to the vehicle while the mirror housing is extended by a shaft, that is attached to the mirror housing and movable within a hydraulic cylinder interconnected to the mirror bracket.

In this respect, the telescopic automotive side mirror according to the present invention substantially departs from the conventional concepts and designs of the prior art, and in doing so provides an apparatus primarily developed for the purpose of allowing the side mirror to be positioned a greater distance from the side of a vehicle when the mirror bracket of the side mirror is interconnected to a hydraulic cylinder and shaft, and further coupled with the mirror housing to expand and retract the mirror housing from the bracket.

Therefore, it can be appreciated that there exists a continuing need for a new and improved telescopic automotive side mirror which can be used for allowing the side mirror to be positioned a greater distance from the side of a vehicle when the mirror bracket of the side mirror is interconnected to a hydraulic cylinder and shaft, and further coupled with the mirror housing to expand and retract the mirror housing from the bracket. In this regard, the present invention substantially fulfills this need.

SUMMARY OF THE INVENTION

In view of the foregoing disadvantages inherent in the known types of adjustable side mirrors now present in the prior art, the present invention provides an improved telescopic automotive side mirror. As such, the general purpose of the present invention, which will be described subsequently in greater detail, is to provide a new and improved telescopic automotive side mirror and method which has all the advantages of the prior art and none of the disadvantages.

To attain this, the present invention essentially comprises a mirror housing that is attached to a side of a vehicle with a tubular mirror bracket. The bracket has a first end and a second end. The second end is positioned within the side of the automobile. The housing has a mirror supported within by a plurality of webbing supports. A support tube is positioned within the mirror housing and interconnected to the plurality of webbing supports. The support tube is axially extended within the housing. A hydraulic cylinder is interconnected to the first end of the bracket and positioned within the support tube of the mirror housing. The hydraulic cylinder has an exit port and a receiving coupler near the first end of the bracket. The hydraulic cylinder has a receiving tube traversing an exterior of the cylinder. The receiving tube has an intake end spaced from the exit port and positioned through a wall of the cylinder. An elongated shaft is positionable within the hydraulic cylinder and a portion thereof projects from the exit port. The shaft has a threaded distal end and a threaded proximal end. The shaft is positioned within the hydraulic cylinder and the support tube when both are positioned within the mirror housing. The proximal end of the shaft is spaced from the receiving coupler of the hydraulic cylinder. The threaded distal end is capable of projecting a small distance beyond the support tube and the mirror housing for receipt of a locking nut. The locking nut is capable of securing the shaft within the support tube and the mirror housing. Lastly, an air compressor is positioned within the automobile and coupled to a switch mechanism. The air compressor is in receipt of an out-take end of the receiving tube. The air compressor has a supply tube that extends therefrom and into the mirror bracket to couple with the receiving coupler of the hydraulic cylinder. The air compressor is capable of supplying air pressure through the supply tube to the shaft, and moves the shaft within the hydraulic cylinder. The shaft, when secured to the mirror housing and within the support tube, is capable of extending and retracting the mirror housing as pressure is applied to the shaft.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved telescopic automotive side mirror which has all of the advantages of the prior art adjustable side mirrors and none of the disadvantages.

It is another object of the present invention to provide a new and improved telescopic automotive side mirror which may be easily and efficiently manufactured and marketed.

It is further object of the present invention to provide a new and improved telescopic automotive side mirror which is of durable and reliable constructions.

An even further object of the present invention is to provide a new and improved telescopic automotive side mirror which is susceptible of a low cost of manufacture with regard to both materials and labor, and which accordingly is then susceptible of low prices of sale to the consuming public, thereby making such telescopic automotive side mirror economically available to the buying public.

Still yet another object of the present invention is to provide a new and improved telescopic automotive side mirror which provides in the apparatuses and methods of the prior art some of the advantages thereof, while simultaneously overcoming some of the disadvantages normally associated therewith.

Even still another object of the present invention is to provide a telescopic automotive side mirror for allowing the side mirror to be positioned a greater distance from the side of a vehicle when the mirror bracket of the side mirror is interconnected to a hydraulic cylinder and shaft, and further capable of being coupled with the mirror housing to expand and retract the mirror housing from the bracket.

Lastly, it is an object of the present invention to provide a new and improved telescopic automotive side mirror including a mirror housing that is attached to a side of automobile. The mirror housing has a tubular mirror bracket and a mirror supported within the housing. The housing has a support tube positioned within and interconnected to a plurality of webbing supports. A hydraulic cylinder is interconnected to a first end of the bracket and positioned within the support tube. The hydraulic cylinder has an exit port and a receiving coupler. A shaft is positioned within the hydraulic cylinder, and a portion thereof projects from the exit port. The shaft has a threaded proximal end and a threaded distal end that is secured within the mirror housing with a locking nut. Lastly, an air compressor is within the automobile and has a supply tube that extends therefrom and through the mirror bracket. The supply tube couples with the receiving coupler of the hydraulic cylinder. The air compressor supplies air pressure to the shaft, for moving the shaft within the hydraulic cylinder, for movement of the mirror housing. different.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 5 is a cut-away cross sectional view of the present invention taken along line 5—5 of FIG. 4.

The same reference numerals refer to the same parts through the various Figures.

DESCRIPTION OF THE PREFERRED EMBODIMENT

Figure 1:
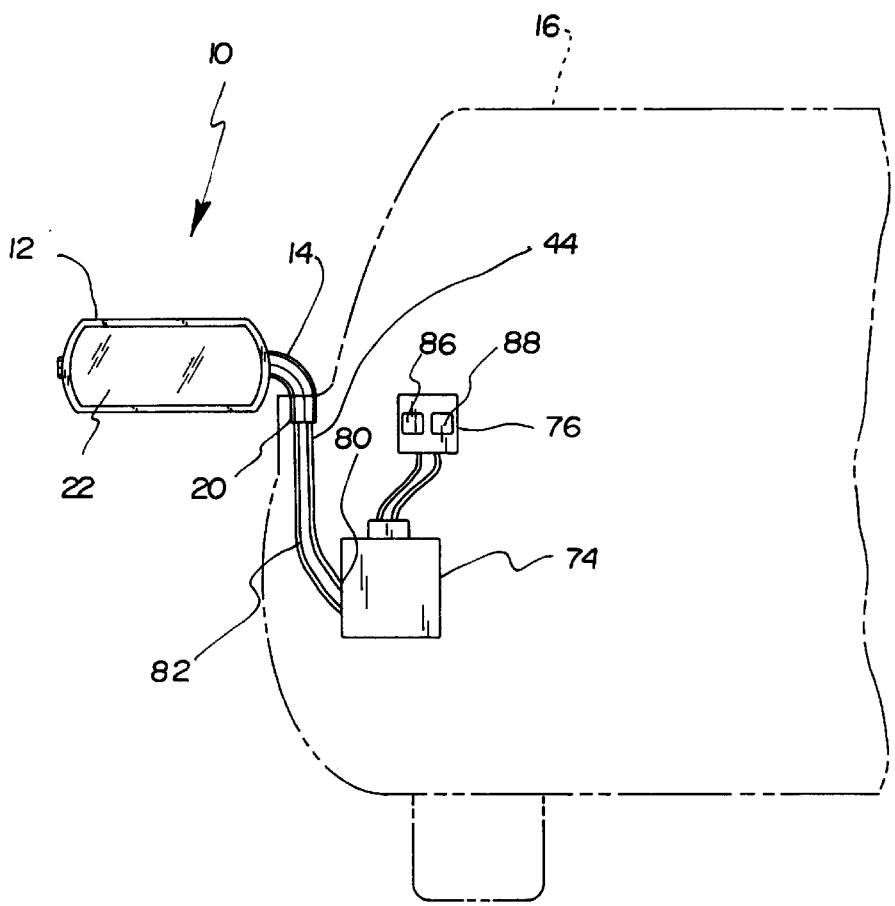
FIG. 1 is a perspective view of the preferred embodiment of the telescopic automotive side mirror constructed in accordance with the principles of the present invention.

With reference now to the drawings, and in particular to FIG. 1 thereof, the preferred embodiment of the new and improved telescopic automotive side mirror embodying the principles and concepts of the present invention and generally designated by the reference numeral 10 will be described.

The present invention, the telescopic automotive side mirror 10 is comprised of a plurality of components. Such components in their broadest context include a side mirror, a bracket, hydraulic system and an air compressor. Such components are individually configured and correlated with respect to each other so as to attain the desired objective.

Figure 2:
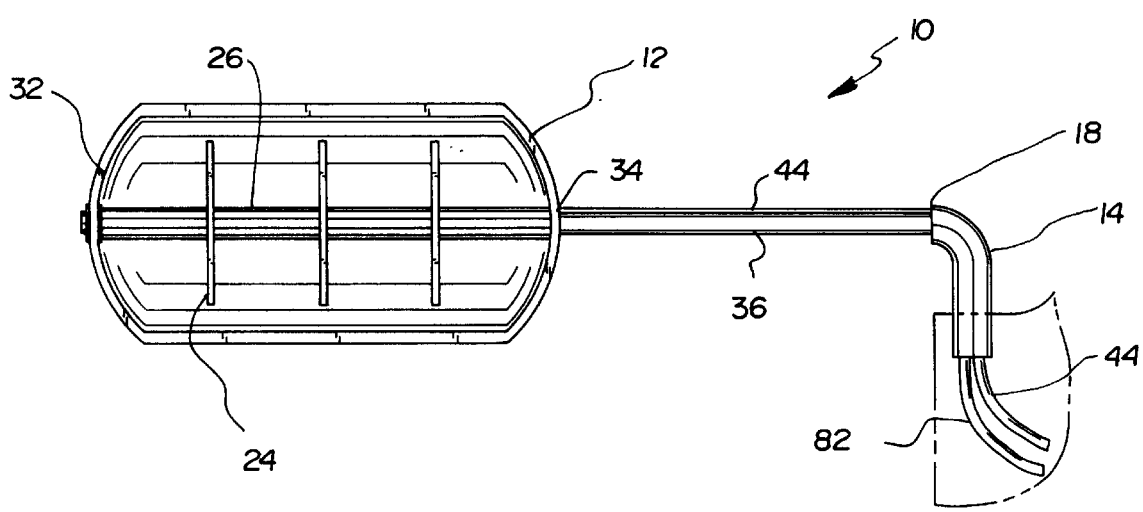
FIG. 2 is a frontal view of the present invention having the mirror removed from the mirror housing.
Figure 3:
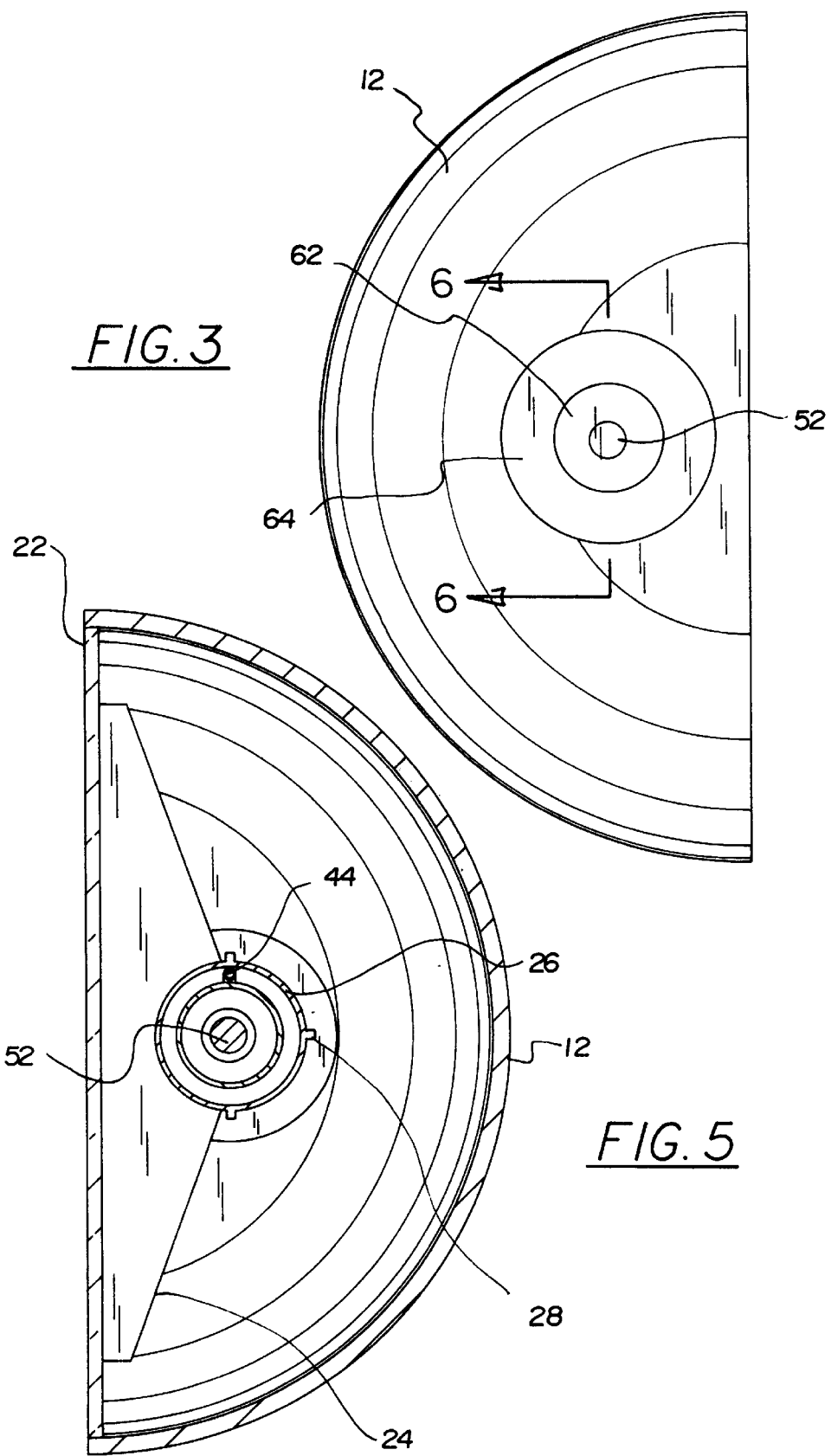
FIG. 3 is a side view of the present invention of FIG. 1.

Specifically, the present invention includes a mirror housing 12 that is formed of a rigid plastic. The housing is attached to a side of a vehicle 16 with a tubular mirror bracket 14. As seen in FIG. 1. The vehicle, as depicted by the drawing, may be an automobile or truck. The bracket has a first end 18 and a second end 20. The second end is positioned within the side of the vehicle. The mirror bracket is formed of a rigid plastic. The housing has a mirror 22 that is supported within by a plurality of webbing supports 24, as seen in FIG. 2. The housing is sized to allow the mirror angle to be adjusted.

A support tube 26 is positioned within the mirror housing 12. The support tube, as seen in FIG. 5, is interconnected to the plurality of webbing supports 24. The support tube has a plurality of guide ribs 28 spaced along a section thereof and opposite the plurality of webbing supports. The support tube is axially extended within the housing, as shown in FIG. 2. The support tube is integral the left 32 and right 34 walls of the housing.

Figure 6:
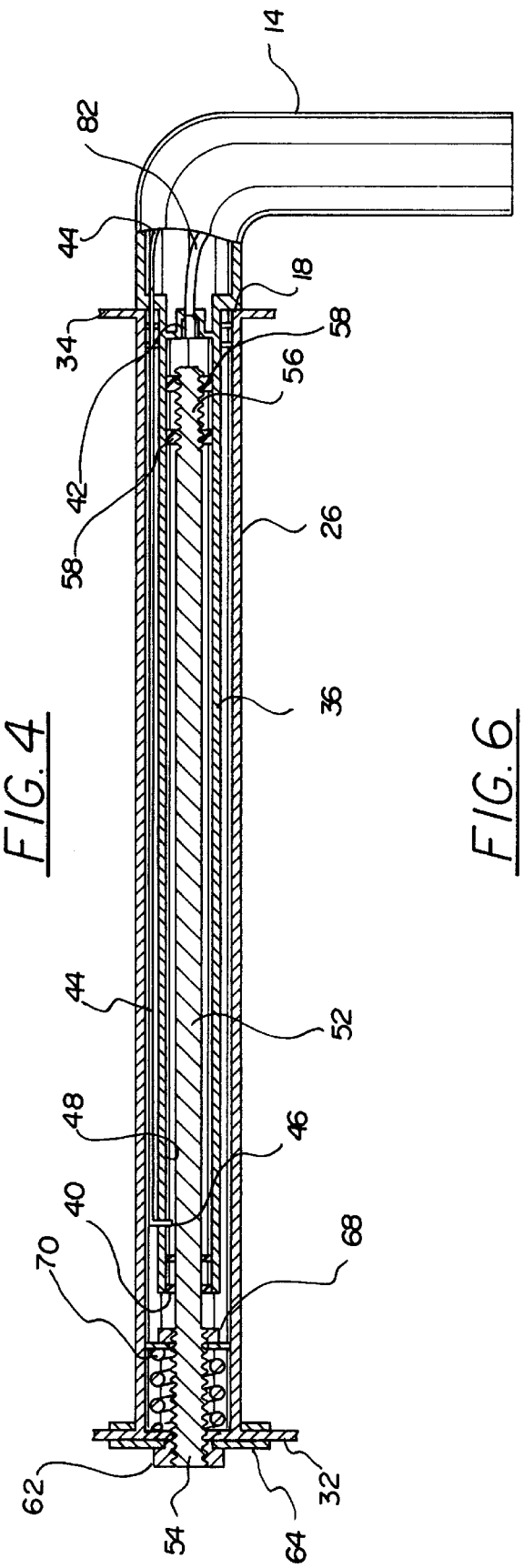
FIG. 6 is a cross sectional view of the telescopic components of the present invention taken along line 6—6 of FIG. 3.

As best illustrated in FIG. 6, a hydraulic cylinder 36 is interconnected to the first end 18 of the bracket 14. The hydraulic cylinder is positioned within the support tube 26 of the mirror housing. The hydraulic cylinder has an exit port 40 and a receiving coupler 42 near the first end of the bracket. The hydraulic cylinder has a receiving tube 44 that traverses an exterior of the cylinder, as seen in FIG. 6. The receiving tube has an intake end 46 that is spaced from the exit port and positioned through a wall 48 of the cylinder. The receiving tube is a rigid tube that passes through the first end of the mirror bracket. The receiving tube is positioned within the bracket and exits at the second end.

Also, an elongated shaft 52 is positioned within the hydraulic cylinder 36. The shaft is a solid metal with a portion projecting from the exit port 40. The shaft, as seen in FIG. 6, has a threaded distal end 54 and a threaded proximal end 56. The shaft is positioned within the hydraulic cylinder and the support tube 26 when both are positioned within the mirror housing 12. The proximal end of the shaft is spaced from the receiving coupler of the hydraulic cylinder. A pair of threaded O-rings 58 are coupled to the proximal end of the shaft. The pair of threaded O-rings function as shaft guides and pistons.

Figure 4:
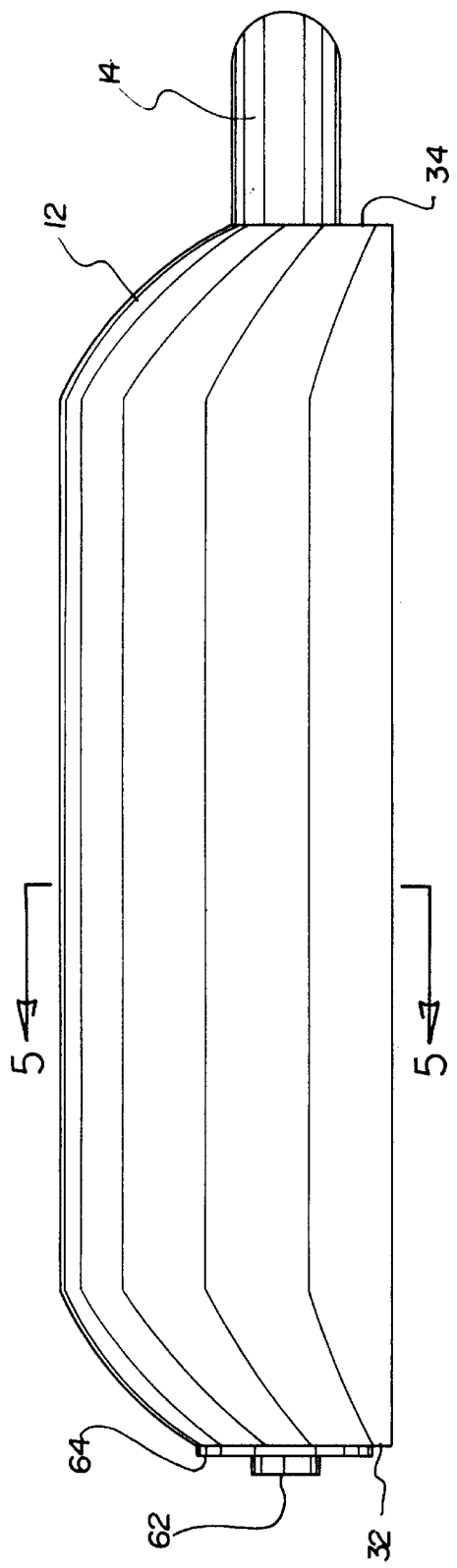
FIG. 4 is a top plan view of the present invention of FIG. 1.

Additionally, the threaded distal end 54, as seen in FIG. 6, is capable of projecting a small distance beyond the support tube and the left wall of the housing. The threaded distal end may engage the mirror and support the tube. As seen in FIG. 4, the present invention has a locking nut 62 and washer 64 are secured to the end of the shaft projecting beyond the left wall, as seen in FIG. 4. The locking nut ensures that the shaft remains within the support tube and the mirror housing.

Included is a dust seal 68, that is coupled to the threaded distal end, between the exit port and the left wall of the housing. The dust seal prevents dust and dirt from entering into the hydraulic cylinder. Adjacent the dust seal and the left wall is a return spring 70.

Lastly, an air compressor 74 is positioned within the vehicle and coupled to a switch mechanism 76. The air compressor is in receipt of an out-take end 80 of the receiving tube 44. The air compressor has a supply tube 82 that extends therefrom and into the mirror bracket 14. The invention is not limited to having dual air lines. If is to be noted that a single line, functioning as the source and return line, would suffice. The supply tube couples with the receiving coupler 42 of the hydraulic cylinder 36. The air compressor is capable of supplying air pressure through the supply tube to the shaft for moving the shaft within the hydraulic cylinder. The shaft, when secured to the mirror housing and within the support tube, is capable of extending and retracting the mirror housing as air pressure is applied. The air compressor of the present invention may be replaces with a vacuum or hydraulic system. The hydraulic system can be a fluid or gas system. Any of the above systems would be suitable for moving the shaft in operation of the mirror. If the hydraulic system were used, the fluid or gas, would flow to the supply tube through the receiving coupler. The fluid or gas would exit by way of the exit port.

Furthermore, the switch has an in button 86 and an out button 88. These buttons control the air pressure flow into the hydraulic cylinder. When the out button is pressed, the air pressure flows into the hydraulic cylinder and presses against the threaded O-ring to cause the shaft to extend the housing a greater distance from the side of the vehicle. When the in button is pressed, the air compressor removes the air from the hydraulic cylinder through the receiving tube. Pressing the in and out buttons allow the mirror housing to be adjusted a desired distance from the side of the vehicle as needed to use the mirror.

The present telescopic automotive side mirror is structure to allow the side mirror to be easily extended beyond the side body of a vehicle as needed. The present invention is very useful when attached to vehicles that have trailers of campers hooked thereon. During normal operation, the present invention remains extended from the side body of the vehicle as currently required by law. But, when a trailer or camper is hitched onto the vehicle, the driver will require the side mirrors to be extended a greater distance. The telescopic automotive side mirror is adjustable from within the vehicle.

The present invention allows the mirror and mirror housing to be extended through hydraulic operations that are controlled by an air compressor. By adding air pressure or removing air pressure from the hydraulic cylinder coupled to a mirror bracket, the mirror housing is extended and retracted as needed by the driver. The present invention replaces the use of a secondary mirror set-up that is normally required when a vehicle has a trailer or camper attached thereto. The present invention provides one multi-purpose use mirror for vehicles.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A telescopic automotive side mirror for extending beyond the side body of a vehicle comprising in combination:

a mirror housing being attached to a side of a vehicle with a tubular mirror bracket, the bracket having a first end and a second end, the second end being positionable within the side of the vehicle, the housing having a mirror being supported within by a plurality of webbing supports, the housing being sized for allowing an adjustable mirror angle;

a support tube positionable within the mirror housing and interconnected to the plurality of webbing supports, the support tube being axially extended within the housing;

a hydraulic cylinder being interconnected to the first end of the bracket and positionable within the support tube of the mirror housing, the hydraulic cylinder having an exit port and a receiving coupler near the first end of the bracket, the hydraulic cylinder having a receiving tube traversing an exterior of the cylinder, the receiving tube having an intake end spaced from the exit port and positionable through a wall of the cylinder;

an elongated shaft being positionable within the hydraulic cylinder with a portion thereof projecting from the exit port, the shaft having a threaded distal end and a threaded proximal end, the shaft being positionable within the hydraulic cylinder and the support tube when both being positioned within the mirror housing, the proximal end of the shaft being spaced from the receiving coupler of the hydraulic cylinder, the threaded distal end being capable of projecting a small distance beyond the support tube and the mirror housing for attaching to the mirror, the threaded distal end of the shaft being capable of securing the shaft within the support tube and the mirror housing; and an air compressor being positionable within the vehicle and coupled to a switch mechanism, the air compressor being in receipt of an out-take end of the receiving tube, the air compressor having a supply tube extending therefrom and into the mirror bracket for coupling with the receiving coupler of the hydraulic cylinder, the air compressor being capable of supplying air pressure through the supply tube to the shaft for moving the shaft within the hydraulic cylinder, the shaft being secured to the mirror housing and within the support tube, being capable of extending and retracting the mirror housing as pressure being applied thereto.

2. A telescopic automotive side mirror comprising:

a mirror housing being attached to a side of an vehicle with a tubular mirror bracket and having a mirror being supported within, the housing having a support tube positionable within and interconnected to a plurality of webbing supports;

a hydraulic cylinder being interconnected to a first end of the bracket and positionable within the support tube, the hydraulic cylinder having an exit port and a receiving coupler;

a shaft being positionable within the hydraulic cylinder with a portion thereof projecting from the exit port, the shaft having a threaded proximal end and a threaded distal end being secured within the mirror housing with a locking nut; and an air compressor being within the vehicle and having a supply tube extending therefrom and through the mirror bracket for coupling with the receiving coupler, the air compressor supplying air pressure to the shaft for moving the shaft within the hydraulic cylinder for movement of the mirror housing.

3. The telescopic automotive side mirror as set forth in claim 2, wherein the bracket having a second end being positionable within the side of the vehicle.

4. The telescopic automotive side mirror as set forth in claim 3, wherein the plurality of webbing supports being capable of supporting the mirror within the housing.

5. The telescopic automotive side mirror as set forth in claim 2, wherein the support tube of the housing being axially extended within the housing.

6. The telescopic automotive side mirror as set forth in claim 2, wherein the hydraulic cylinder having a receiving tube traversing an exterior of the cylinder, and the receiving tube being capable of passing through the mirror bracket.

7. The telescopic automotive side mirror as set forth in claim 6, wherein the receiving tube having an intake end spaced from the exit port and positionable through a wall of the cylinder, and an out-take end being positionable within the air compressor.

8. The telescopic automotive side mirror as set forth in claim 6, wherein the shaft being positionable within the hydraulic cylinder and the support tube when both being positioned within the mirror housing.

9. The telescopic automotive side mirror as set forth in claim 8, wherein the threaded proximal end of the shaft being spaced from the receiving coupler of the hydraulic cylinder, and the threaded distal end of the shaft projecting a small distance beyond the support tube and the mirror housing for attaching thereto.

10. The telescopic automotive side mirror as set forth in claim 2, wherein the air compressor being coupled to a switch mechanism positionable within the vehicle.

11. The telescopic automotive side mirror as set forth in claim 10, wherein the switch mechanism of the air compressor being capable of controlling the air pressure flow being released therefrom.

12. The telescopic automotive side mirror as set forth in claim 11, wherein the air pressure being supplied to the shaft through the supply tube being capable of allowing the shaft to extend and retract the mirror housing with respect to the mirror bracket.

13. A telescopic automotive side mirror comprising:

a mirror housing with a tubular mirror bracket and having a mirror supported therein;

a hydraulic cylinder being interconnected to the tubular mirror bracket and positionable within a support tube of the housing; and a shaft being positioned within the hydraulic cylinder and secured within the mirror housing, whereby the mirror housing is capable of being telescopically extended and retracted.

14. The telescopic automotive side mirror as set forth in claim 13, wherein the hydraulic cylinder having an exit port with the shaft projecting therefrom, and a receiving coupler for receiving a supply tube.

15. The telescopic automotive side mirror as set forth in claim 14, wherein the hydraulic cylinder having a receiving tube with an intake end spaced from the exit port and positioned through a wall of the cylinder.

16. The telescopic automotive side mirror as set forth in claim 13, including an air compressor being in receipt of one end of a supply tube for supplying air pressure to the shaft from within a vehicle, the air compressor being in receipt of an out-take end of a receiving tube, and the air compressor being capable of supplying air pressure through the supply tube to the shaft for moving the shaft within the hydraulic cylinder, the air compressor being capable of receiving air through the receiving tube for retracting the shaft into the hydraulic cylinder.

* * * * *